United States Patent
Lim et al.

(10) Patent No.: US 6,785,077 B2
(45) Date of Patent: Aug. 31, 2004

(54) DISC DRIVE PATTERN ZERO VERIFICATION TEST

(75) Inventors: TeckKhoon Lim, Singapore (SG); SoonWah Leow, Singapore (SG); ChewHoon Angie Neo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 298 days.

(21) Appl. No.: 10/033,065

(22) Filed: Oct. 29, 2001

(65) Prior Publication Data

US 2002/0141091 A1 Oct. 3, 2002

Related U.S. Application Data

(60) Provisional application No. 60/280,883, filed on Apr. 2, 2001.

(51) Int. Cl.[7] .................................................. G11B 5/09
(52) U.S. Cl. ....................................................... 360/53
(58) Field of Search ............................ 360/126, 26, 31, 360/53; 714/42

(56) References Cited

U.S. PATENT DOCUMENTS

| | | | |
|---|---|---|---|
| 4,044,329 A | * 8/1977 | Besenfelder et al. | ........ 714/700 |
| 4,525,838 A | * 6/1985 | Patel | ........................... 714/755 |
| 4,706,250 A | * 11/1987 | Patel | ........................... 714/761 |
| 5,422,890 A | 6/1995 | Klingsporn et al. | ........ 371/21.6 |
| 5,687,176 A | * 11/1997 | Wisniewski et al. | ........ 370/476 |
| 5,737,519 A | 4/1998 | Abdelnour et al. | .... 395/183.15 |
| 6,043,946 A | 3/2000 | Genheimer et al. | ........... 360/53 |
| 6,192,492 B1 | 2/2001 | Masiewicz et al. | ........... 714/56 |
| 6,205,569 B1 | 3/2001 | Forehand et al. | ........... 714/763 |
| 6,532,201 B1 | * 3/2003 | Hogan | ..................... 369/53.21 |

OTHER PUBLICATIONS

Product Manual of Seagate Technology, Inc., dated Jan. 2000, for the U10 Family (interface drives).

* cited by examiner

*Primary Examiner*—David Hudspeth
*Assistant Examiner*—Fred F. Tzeng
(74) *Attorney, Agent, or Firm*—Westman, Champlin & Kelly

(57) ABSTRACT

In a pattern zero verification test, a data track of a disc drive is read. During the reading of the data track, on-the-fly counting of potential non-zero data bytes (potential count), sectors on which ECC correction has been performed (corrected sector count), and user data bytes on which ECC correction has been performed (corrected byte count) is performed. Next, various conditions of the potential, corrected sector, and corrected byte counts are checked to determine whether the data track includes only zero data bytes.

33 Claims, 7 Drawing Sheets

DISC DRIVE PATTERN ZERO VERIFICATION TEST

CROSS-REFERENCE TO RELATED APPLICATION

The present invention claims priority to U.S. Provisional Application 60/280,883, filed Apr. 2, 2001 and entitled "ADVANCE SOFTWARE VERIFICATION FOR PATTERN ZERO IN DISC DRIVE."

FIELD OF THE INVENTION

The present invention relates generally to the field of disc drive storage systems. More particularly, the present invention relates to a pattern zero verification test for a disc drive storage system.

BACKGROUND OF THE INVENTION

Disc drives are the primary devices employed for mass storage of computer programs and data used in computer systems on magnetic discs. The reliability of the disc drive is, therefore, critical to the operation of the computer systems. As a result, disc drives typically undergo a certification process prior to their shipment to customers. The certification process generally includes a series of tests that are conducted to optimize the performance of the disc drive and ensure that the disc drive meets predetermined specifications. Two such tests are the error rate performance test and the pattern zero verification (PZV) test.

The error rate performance test generally includes multiple writes and reads to data sectors on the disc drive. These multiple writes/reads are used to identify errors on the disc surfaces which indicate that certain sectors on the disc cannot be reliably written to or read from. These errors may arise from defects in the disc media, the disc heads, disc servo mechanisms, noise or other sources. While it is preferable that a disc have no errors associated with it, as a practical matter, disc drives often have various errors, such as media errors, due to manufacturing processes, handling or other causes.

Recognizing this, disc drive manufacturers have established various acceptable error rates for disc drives. Error rates are a measure of the ability to consistently read data from and write data to the disc. The acceptable error rates may be expressed as total numbers of errors for a given number of bytes, maximum acceptable errors of any type of error, or the total number of errors occurring for a given number of bytes read.

Some errors that are encountered can be compensated for using various techniques. One such technique is implemented during the transmission of data and utilizes error correction code (ECC) circuitry along with various ECC formats to perform compensation, which are known in the art. The performance error test is typically implemented in hardware without the need for firmware intervention allowing data detection and correction on-the-fly as the data stream is being read, with the computer system not even being aware that an error was detected.

The PZV test is typically the last test that is performed on the disc drive prior to shipment to the customer. The purpose of the PZV test is to verify that the user data tracks of the discs contain only data bytes representing the value zero. These zero data bytes must be written to the user data tracks, generally during the error rate performance test, in order for some types of software to operate properly. When user data bytes representing a non-zero value (non-zero data bytes) are detected the location of the non-zero data bytes are determined and stored in an error log of the disc drive.

Prior art PZV tests are generally implemented in software and only check the first few hundred tracks, out of the hundreds of thousands of data tracks on a disc. The selected tracks are typically located at the outer diameter of the disc. Accordingly, the percentage of total tracks tested is extremely small. This is primarily due to the fact that the test is very time consuming. For example, the time required to complete the test for 100 tracks is approximately 6 minutes for each disc surface on which data is stored. As a result, the test takes approximately 28 minutes to complete when testing a four head disc drive. Moreover, to scan the entire disc surface of each disc in one four head disc drive, the PZV test would take approximately 79 hours to complete. Consequently, it can be understood why only a small number of data tracks are tested. However, by leaving several hundred thousand tracks of the disc drive untested, there remains a strong potential that some of the data tracks contain non-zero data bytes.

Ideally, the PZV test should be conducted on each of the hundreds of thousands of data tracks of the disc drive to ensure disc drive reliability. Furthermore, the PZV test should be efficient to minimize the duration of the certification process for the disc drive and reduce manufacturing costs. Accordingly, there exists a need for an improved PZV test having greater efficiency than those of the prior art while providing a more thorough analysis of the disc drive.

SUMMARY OF THE INVENTION

The present invention is directed to an improved pattern zero verification test having greater efficiency than those of the prior art while providing full disc scan capability. In the method, a data track of the disc drive is read. During the reading of the data track, on-the-fly counting of potential non-zero data bytes (potential count), sectors on which ECC correction has been performed (corrected sector count), and user data bytes on which ECC correction has been performed (corrected byte count) is performed. Next, various conditions of the potential, corrected sector, and corrected byte counts are checked to determine whether the data track includes only zero data bytes.

DETAILED DESCRIPTION OF ILLUSTRATIVE EMBODIMENTS

Figure 1:
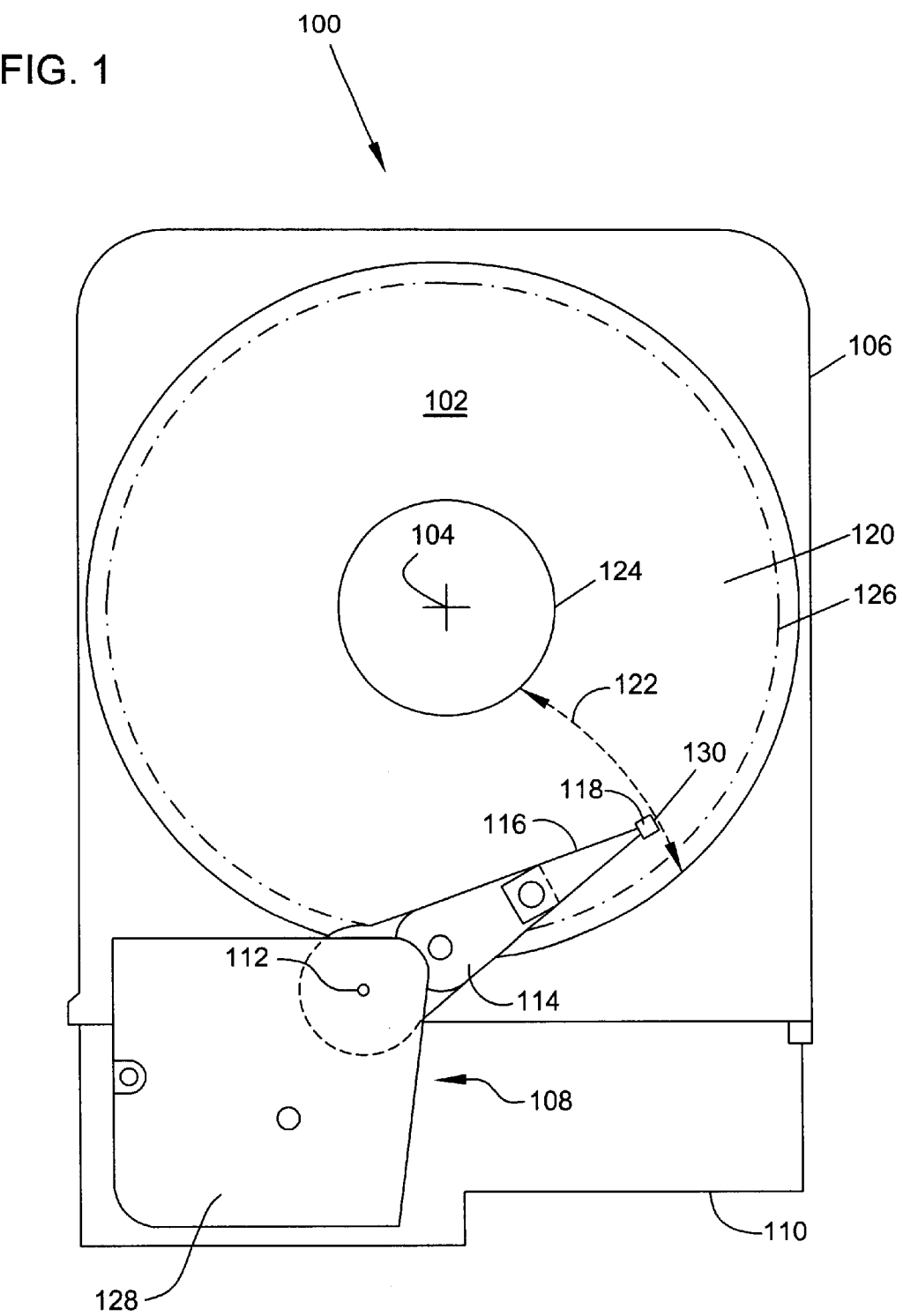
FIG. 1 is a top view of a disc drive storage system with which embodiments of the present invention may be used.

FIG. 1 is a top view of a disc drive 100, with which embodiments of the present invention may be used. Disc drive 100 includes a magnetic disc 102 mounted for rotational movement about an axis 104 and driven by spindle motor (not shown). The components of disc drive 100 are contained within a housing that includes base 106 and a cover (not shown). Disc drive 100 also includes an actuator mechanism 108 mounted to a base plate 110 and pivotally moveable to disc 102 about axis 112. Actuator mechanism 108 includes actuator arm 114 and suspension assembly 116. Slider 118 is coupled to suspension assembly 116 through a gimbaled attachment which allows slider 118 to pitch and roll as it rides on an air bearing above surface 120 of disc 102. Actuator mechanism 108 is adapted to rotate slider 118 on arcuate path 122 between an inner diameter 124 and an outer diameter 126 of disc 102. A cover 128 can cover a portion of actuator mechanism 108. Slider 118 supports a head 130 having separate read and write transducing elements for reading information from and writing information to concentric data tracks on disc 102.

During operation, as disc 102 rotates, air (and/or a lubricant) is dragged under air bearing surfaces (ABS) of slider 118 in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a load force provided by suspension 116 and causes slider 118 to "fly" above and in close proximity to disc surface 120. This allows slider 118 to support head 130 in close proximity to the disc surface 120.

Figure 2:
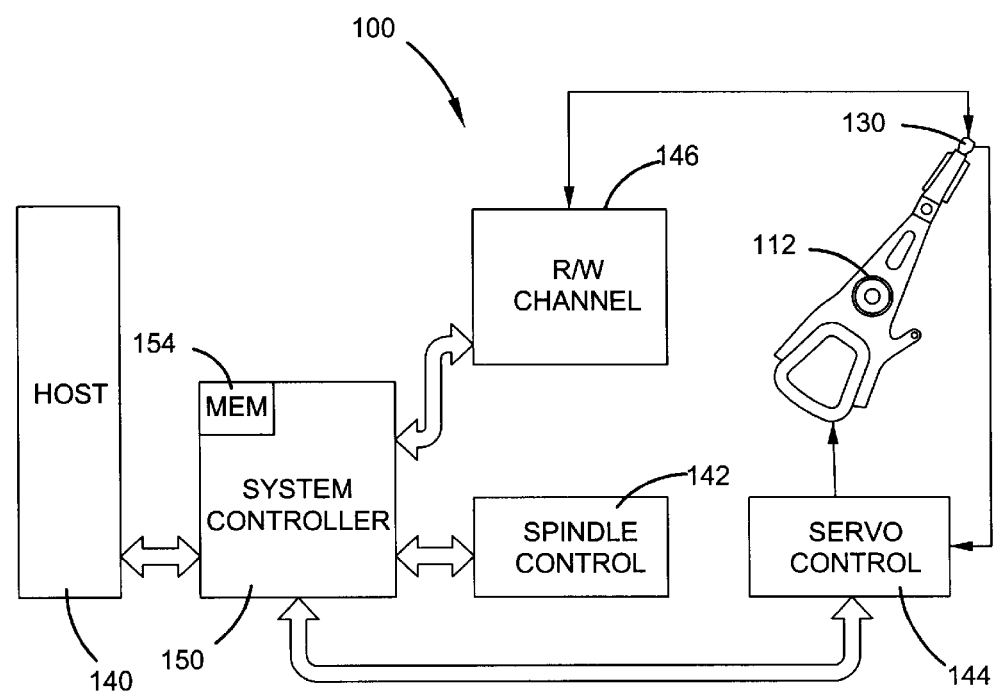
FIG. 2 is a simplified block diagram of a disc drive, in accordance with an embodiment of the invention.

FIG. 2 provides a general functional block diagram of disc drive 100 of FIG. 1, operably connected to a host computer 140. As shown in FIG. 2, disc drive 100 generally comprises a spindle control circuit 142, a servo control circuit 144 and a read/write channel 146, all of which are in communication with and controlled by a system controller 150. System controller 150 includes a microprocessor (not shown) and operates, in part, as a data interface and buffer for disc drive 100. Spindle control circuit 142 controls the rotational speed of the spindle motor in a conventional manner. System controller 150 is preferably designed in accordance with an industry standard AT-Attachment or ATA drive interface and generally includes hardware used to establish varying timing sequences during the operation of the read/write channel 146. Memory (MEM) 154 in the form of random access memory (RAM), read-only memory (ROM) and the like are provided to store programming utilized by the system controller 150.

System controller 150 controls actuator mechanism 108 through a suitable connection. During operation, system controller 150 receives position information indicating a track of disc 102 to be accessed. The position information can be provided by an operator, host computer 140, or from another suitable controller. Based on the position information, system controller 150 provides a position signal to servo control circuit 144. Servo control circuit 144 is shown to receive servo information from head 130. The servo information is compared to the position signal and, servo control circuit, in response thereto, provides a correction signal to actuator mechanism 108. Actuator mechanism 108 is then caused to pivot about axis 112. This, in turn, causes slider 118, and the head 130 it is supporting, to move radially over disc surface 120 along path 122. Once head 130 is appropriately positioned, system controller 150 then executes a desired read or write operation.

The read/write channel 146 operates to write data to the disc 102 in response to user data provided to the channel from the system controller 150 by encoding and serializing the data and generating a write current utilized by the head 130 to selectively magnetize portions of a selected track on the disc surface 120. Correspondingly, the previously stored data is retrieved by the read/write channel 146 by reconstructing the data from the read signals generated by the head 130 as the selected track passes under the head 130.

As discussed above, newly assembled disc drives must pass a certification process prior to their shipment to customers. The process typically involves several tuning and testing processes including: read channel tuning, servo system optimization, and media defect scan. An error rate performance test and a pattern zero verification (PZV) test are typically the last tests that are performed on the disc drive. The error rate performance test detects sectors on the disc that cannot be reliably written to or read from. These errors may arise from defects in the disc media, the disc heads, disc servo mechanisms, noise or other sources. The purpose of the PZV test is to verify that the user data bytes stored in the user data tracks of the discs are patterned as zeros (zero data bytes). These zero data bytes are required to be written to the user data tracks in order for some types of software to operate properly.

Figure 3:
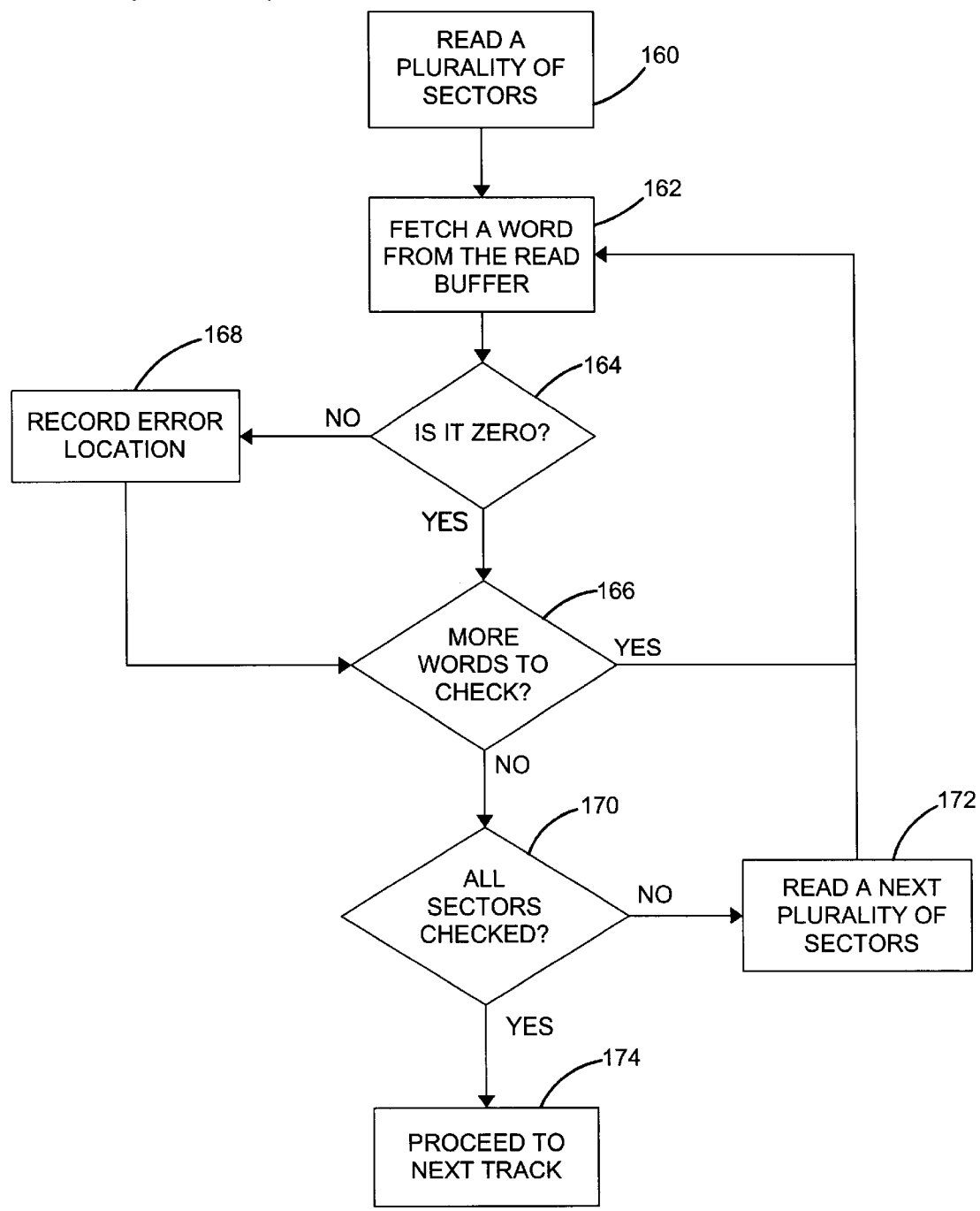
FIG. 3 is a flowchart illustrating a pattern zero verification test performed in software, in accordance with methods of the prior art.

PZV test methods of the prior art have been implemented in software as a separate test from the error performance rate test. FIG. 3 is a flowchart illustrating a typical PZV test of the prior art that is implemented in software. At step 160, a plurality of data sectors, depending on the size of the read buffer, are first read. For example, the number of sectors of data in the data track could be one hundred and fifty and the number of sectors that the buffer is capable of storing could be one hundred. Next, at step 162, each data word (pair of data bytes) in the read buffer is then fetched to the processor's internal register and compared with the value zero at step 164. If the word is zero, the test will proceed to check whether there are any more words in the read buffer to check, at step 166. If there are, the method returns to step 162 and the next word is fetched from the read buffer. If the word is a non-zero data byte, the location of the word in the user data track is determined and recorded in an error log of the disc drive in the form of the track, head and sector that correspond to it, at step 168.

When it is determined in step 166 that all of the words of the read buffer have been checked, the method moves to step 170, in which a check is performed to determine whether any additional sectors in the track remain to be read. If there are additional sectors to be read, the method moves to step 172, at which the next plurality of data sectors (e.g., fifty) are read into the read buffer and the checking process starts over at step 162. It should be noted that some disc drives may require more than two read operations to completely read a data track. For example, a disc drive having a read buffer of 40 sectors and 200 sectors per track requires five read operations to be performed in order to verify that each sector in the track contains only zero data bytes. Once all of the sectors have been checked, the method proceeds to the next track, as indicated at step 174.

The primary problem with the method of the prior art illustrated above is that it is simply too time consuming. As a result, the test is typically limited to approximately one hundred tracks at the outer diameter of each disc surface corresponding to a head of the disc drive in order to reduce the time required to complete the certification process for the disc drive. Unfortunately, such a limitation results in a greater likelihood that a disc drive will pass the certification process even though it contains non-zero data bytes in the user data tracks.

As will be discussed below in greater detail, the present invention relates to methods of performing a PZV test that take advantage of hardware features provided by existing system controllers 150 (FIG. 2), such as that found in the U10 family of 5,400 RPM, Ultra ATA/66 disc drives produced by Seagate Technology LLC of Scotts Valley, Calif., that are used to conduct the error rate performance test. The interface includes hardware features that before now were used for purposes other than performing PZV testing. Embodiments of the present invention make use of these hardware features to provide PZV testing that is more efficient and allows for more thorough testing of the disc drive, than previously provided by prior art methods.

Figure 4:
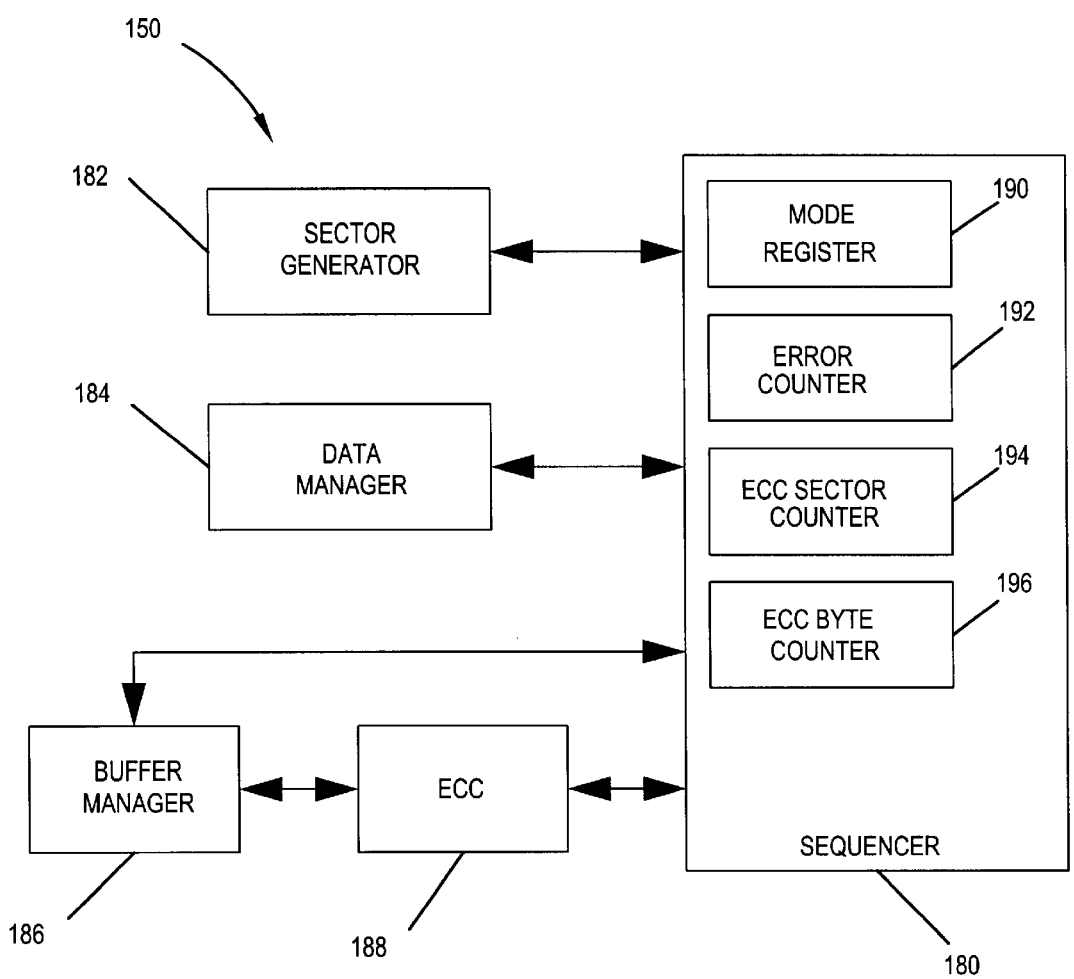
FIG. 4 is a simplified block diagram of an system controller, in accordance an embodiment of the invention.

FIG. 4 shows some of the components of a system controller 150 in accordance with an embodiment of the present invention. The depicted components are controlled by a microprocessor (not shown). System controller 150 includes a disc sequencer 180 that interfaces with a sector generator 182, a data manager 184, a buffer manager 186, and error correction code (ECC) circuitry 188. Sequencer 180 generally places a structure on the data stream that is exchanged with read channel 146 (FIG. 2). Sector generator 182 generates a pulse to indicate the start of each sector, and a servo split signal to indicate that sequencer 180 should stop reading or writing while servo information is passing under head 130 (FIG. 1) and being detected by servo control circuit 144 (FIG. 2). Data manager 184 provides data buffers to sequencer 180 during disc read and write operations. Sequencer 180 will not read from, or write to, a sector unless a buffer is available. Sequencer 180 will release the buffer to data manager 184 when it is finished with the transfer. Buffer manager 186 provides access to external RAM buffers (not shown), which is requested by sequencer 180. When a buffer cycle is granted to sequencer 180, a pointer to the buffer address is provided to sequencer 180 by the buffer manager 186. The buffer data is then either provided to, or received from, sequencer 180 through ECC block 188.

As is well known, ECC encoding is initially performed by the write channel portion of the read/write channel 146 (FIG. 2) by appending a number of code symbols to the end of each selected portion of data symbols to generate encoded words (or interleaves) that mathematically map into a Galois field. That is, the code symbols are added to the data symbols so that the total set of symbols can be considered to be the coefficients of a polynomial having defined roots, so that only mathematically defined combinations can legally exist. When an encoded word is retrieved, the word is compared to the set of defined combinations, so that encoded words containing read errors will generally not map into the set of defined combinations. Therefore, based upon the algorithm used by ECC circuitry 188, illegal combinations can be detected and up to a selected number of the data symbols in such words can be changed in order to correct the presence of read errors therein. Once the data has been corrected, the code bits are stripped, allowing the originally recorded data to be output by ECC circuit 188 to sequencer 180 of system controller 150 and then on to host computer 140 (FIG. 2). ECC circuit 188 is implemented in the hardware of system controller 150 thereby allowing for on-the-fly detection and correction to take place without the need for firmware intervention.

Sequencer 180 includes several count registers including a mode register 190, an error counter 192, an ECC sector counter 194, and an ECC byte counter 196. Mode and error counter registers 190 and 192 are typically used for read/write channel tuning while ECC sector counter 194 and ECC byte counter 196 are used in drive normal retry operation. The sequencer 180 is programmed through the firmware to make use of these registers for detection of non-zero data bytes to perform PZV testing.

The mode register 190 is used to select the disc drive in a non-zero pattern detection mode in which the PZV test is conducted. Error counter 192 is used to perform on-the-fly counting of a number of data bytes that are either non-zero bytes or bytes containing errors that require ECC correction, defined as a potential count. Thus, the potential count relates to the number of data bytes that are could be non-zero data bytes. Error counter 192 is cleared prior to the start of a read operation and stops when it reaches a maximum value, typically 0FFFh, and does not roll over to 0000. The ECC sector counter 194 is used to perform on-the-fly counting of a number of sectors on which ECC correction has been performed by ECC circuit 188; the number is defined as a corrected sector count. ECC sector counter 194 is cleared prior to the start of a read operation and stops when it reaches a maximum value, typically 03FFh, and will not overflow. ECC byte counter 196 performs on-the-fly counting of a number of data bytes on which ECC correction has been performed by ECC circuit 188; the number is defined as a corrected byte count. ECC byte counter 196 is cleared prior to the start of a read operation and has a maximum value corresponding to the number of bytes per sector (typically 32). As a result of the limited counting capability of ECC byte counter 196, ECC byte counter 196 is primarily valid only when ECC sector counter 194 is 1.

Figure 5:
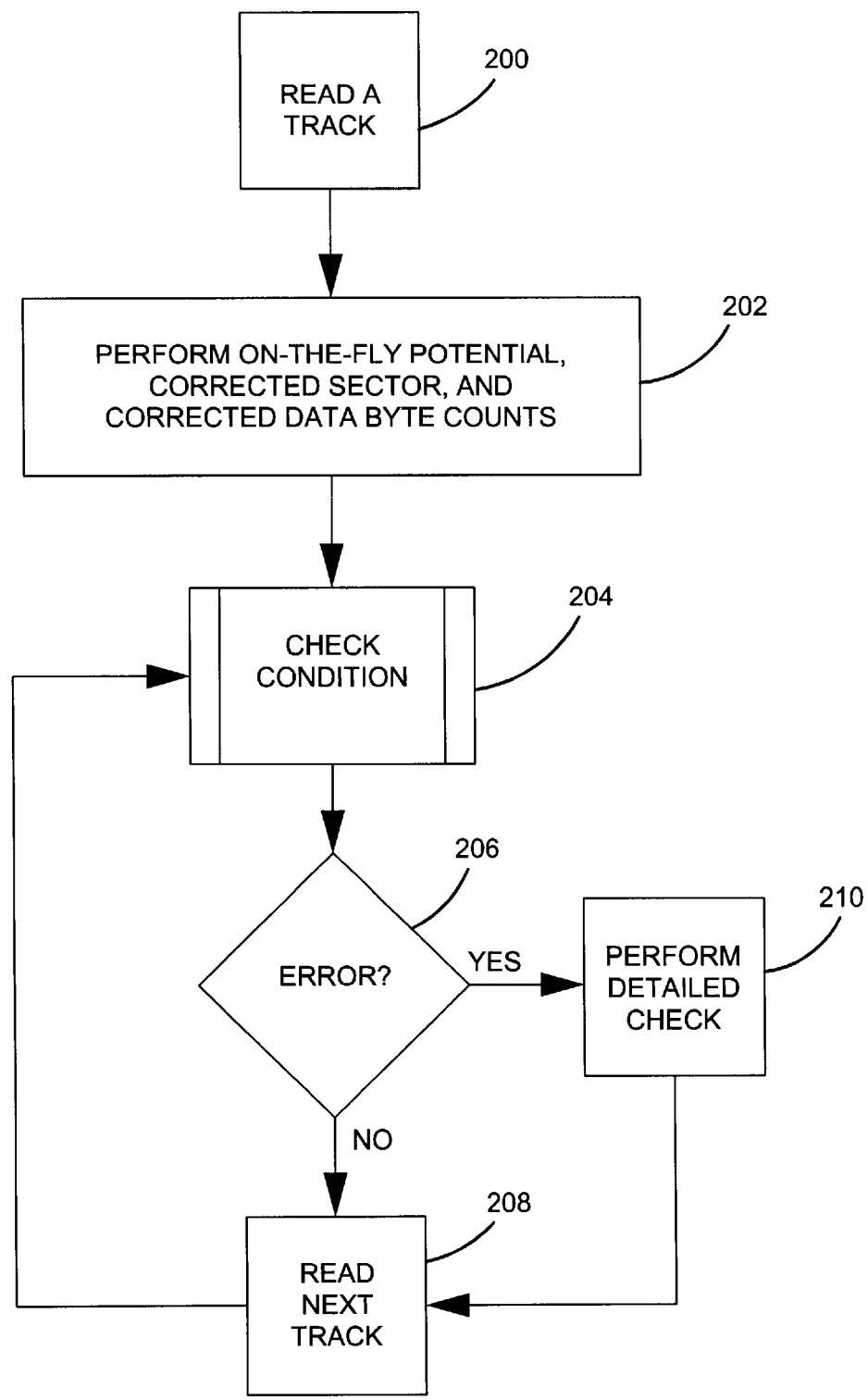
FIG. 5 is a flowchart illustrating a pattern zero verification test in accordance with an embodiment of the invention.

FIG. 5 is a flowchart illustrating a method of testing at least one data track of a disc 102 (FIG. 1) of a disc drive storage system 100 (FIG. 1), to determine whether bytes of user data stored thereon are zero data bytes. At step 200, a data track of the disc drive is read in accordance with conventional methods. During the read, at step 202, sequencer 180 of system controller 150 performs on-the-fly counting of: (1) potential non-zero data bytes (potential count) using error counter 192; (2) sectors on which ECC correction has been performed (corrected sector count) using ECC sector counter 194; and user data bytes on which ECC correction has been performed (corrected byte count) using ECC byte counter 196. Next, at step 204, various conditions can be checked to determine whether the data track includes only zero data bytes, a non-zero data byte, and/or a potentially non-zero data byte, in accordance with the various embodiments of the invention. In the event that the data track includes a non-zero or potentially non-zero data byte, step 204 returns a finding that an error has occurred to step 206 and, otherwise, that no error has occurred. In the event that the data track includes only zero data bytes (i.e. no error), the method moves to step 208 at which the next track on the disc is read. Step 208 can be repeated to perform testing of a portion of the disc or perform testing of the entire disc. In the event an error is returned at step 206, the method moves to step 210 where a detailed check of the data track is performed. As will be discussed in greater detail below, this step of the method can perform the testing of the data track in accordance with the prior art software method discussed with reference to FIG. 3, or a preferred method that combines the hardware testing of the present invention along with the software method thereby improving the efficiency of that test.

The check condition step 204 of FIG. 5 is generally performed to determine whether certain conditions exist that indicate that the data track either contains only zero data bytes, a non-zero data byte, or a potentially non-zero data byte. It should be understood that the particular steps and their order could be modified while still providing the desired testing function. In one embodiment, the method of the present invention checks at least one condition which, if exists, confirms that the data track includes only zero data bytes. One of these conditions is that no non-zero data bytes or data bytes that require ECC correction are detected. Another one of these conditions is that the corrected sector count is equal to the potential count. This is due to the fact that for every potential non-zero data byte, or data byte requiring correction as indicated by the potential count, ECC correction of a data byte was performed. In other words, when this condition is met, the potential count relates only to data bytes requiring ECC correction. Yet another of these conditions is that the corrected sector count is equal to one and the corrected byte count is equal to the potential count. Here, with the corrected sector count set to one, the corrected byte count is valid. Thus, when the corrected byte count is equal to a potential count, it is known that the potential count relates only to data bytes requiring ECC correction.

In another embodiment of the invention, the method checks for the existence of conditions that would indicate that the data track includes at least one non-zero data byte in step 204 of FIG. 5. One of these conditions is that the potential count is greater than zero and the corrected sector count is zero. This condition indicates that the potential count relates only to non-zero data bytes, since no ECC correction was performed on any data byte. Another one of these conditions is that the corrected sector count is one and the corrected byte count is not equal to the potential count. This condition, like the previous one, indicates that the potential count relates to non-zero data bytes since the number of data bytes on which ECC correction was performed was less than the potential count. As a result, if these conditions exist, the data track includes non-zero data bytes.

Yet another embodiment of the method checks whether a certain condition exists that indicates that the data track includes a potentially non-zero data byte in step 204. One such condition is that the corrected sector count is greater than one and the sector count is not equal to the potential count. The reason this condition, when met, indicates the existence of a potentially non-zero data byte, is due to the fact that the corrected byte count is not valid since the corrected sector count is greater than one and, thus, the actual number of bytes on which ECC correction was performed is unknown. Accordingly, it is possible that the number of bytes on which ECC correction is performed is equal to the potential counts so that the data track includes only zero data bytes. However, it is also possible that the actual number of bytes on which ECC correction was performed is different than the potential count resulting in the data track including at least one non-zero data byte. As a result, the test of this condition reveals only that the data track could have a non-zero data byte.

Figure 6:
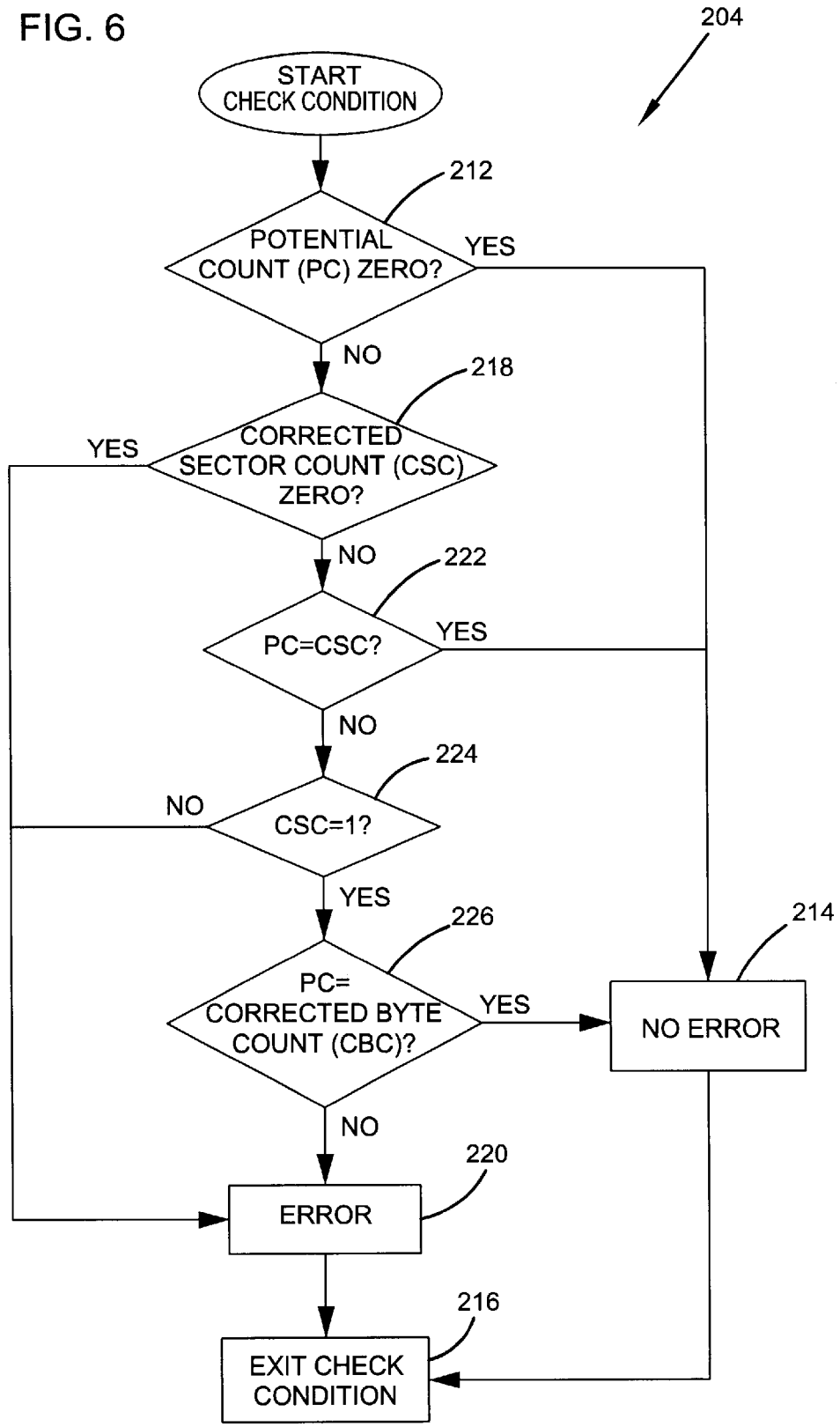
FIG. 6 is a flowchart illustrating a method of performing a step of the method of FIG. 5, in accordance with an embodiment of the invention.

FIG. 6 is a flowchart illustrating one method that can be performed to check the above-described conditions to determine whether the data track includes only zero data bytes, a non-zero data byte, or a potentially non-zero data byte, in accordance with an embodiment of the invention. Although the depicted method checks for all of the conditions discussed above, some applications of the present invention may not require all of the conditions to be checked. In step 212, the method checks whether the potential count is zero. If it is determined that the potential count is zero, no error is detected and the data track contains only zero data bytes, as indicated at step 214. The method then proceeds to exit the check condition step at step 216, and proceeds to step 206 of FIG. 5.

If the potential count is not equal to zero, the method moves to step 218 in which a check is made to determine whether the corrected sector count is equal to zero. If the corrected sector count is equal to zero and the potential count is greater than zero (as determined in step 212) the method proceeds to step 220 which indicates that the data track includes an error in the form of a non-zero data byte. The method then exits the check condition at step 216. In the event that the corrected sector count is not equal to zero, the method proceeds to step 222 in which a check is made as to whether the potential count is equal to the corrected sector count. If the potential count is equal to the corrected sector count, the data track includes only zero data bytes. As a result, the method proceeds to step 214 which indicates that the track does not contain an error and the method is exited at step 216. If the potential count is not equal to the corrected sector count, the method proceeds to step 224 in which a check is made as to whether the corrected sector count is equal to one. If the corrected sector count is not equal to one, there is a potential that the data track includes a non-zero data byte and the method proceeds to step 220 to indicate that the data track may contain an error prior to exiting the check condition step 204 and proceeding to step 206 of FIG. 5.

If the corrected sector count is equal to one, the method moves to step 226 in which a check is made as to whether the potential count is equal to the corrected byte count. If the potential count is equal to the corrected byte count, then the data track includes only zero data bytes and, therefore, no error as indicated at step 214. The method then proceeds to exit at step 216 and proceed to step 206 of FIG. 5. If the potential count is not equal to the corrected byte count, the data track includes non-zero data bytes and an error is indicated at step 206 prior to exiting the check condition step 204 to step 206 of FIG. 5.

When the check condition step 204 returns with an indication that the data track contains only zero data bytes, the method proceeds to step 208 in which the next data track is read if desired and the method continues again at the check condition step 204 as shown in FIG. 5. However, if step 204 returns with an indication that the data track includes an error, or in other words, that the data track does not include only zero data bytes, the method proceeds to step 210 in which a detailed check is performed.

In one embodiment, the detailed check step 210 substantially mirrors the software check of FIG. 3. Accordingly, at step 160 a plurality of data sectors of the read track are read into a read buffer. Next, at step 162, a data word is fetched from the read buffer and the data word is checked to determine if it is a zero data byte, as indicated at step 164. If the data word includes only zero data bytes, the method proceeds to step 166 where a check is made to determine whether any additional data words remain to be checked. If the read buffer contains data words that have yet to be checked, the method returns to step 162 and another data word is fetched from the read buffer and the method continues from there. If it is determined in step 164 that the data word does not contain only zero data bytes, the method proceeds to step 168 where a location of the data word is recorded in an error log in accordance with conventional methods. The method then proceeds to step 166 where it continues as described above. Once it is determined in step 166 that there are no further data words in the read buffer that remain to be checked, the method proceeds to step 170 where, if all sectors of the data track have been read into the read buffer, the method proceeds to step 208 in FIG. 5 and reads the next track to be tested. If, however, additional sectors of the data track remain to be read into the read buffer, a next plurality of data sectors of the read track are read into the read buffer, at step 172, and the method continues as described above with step 162.

Figure 7:
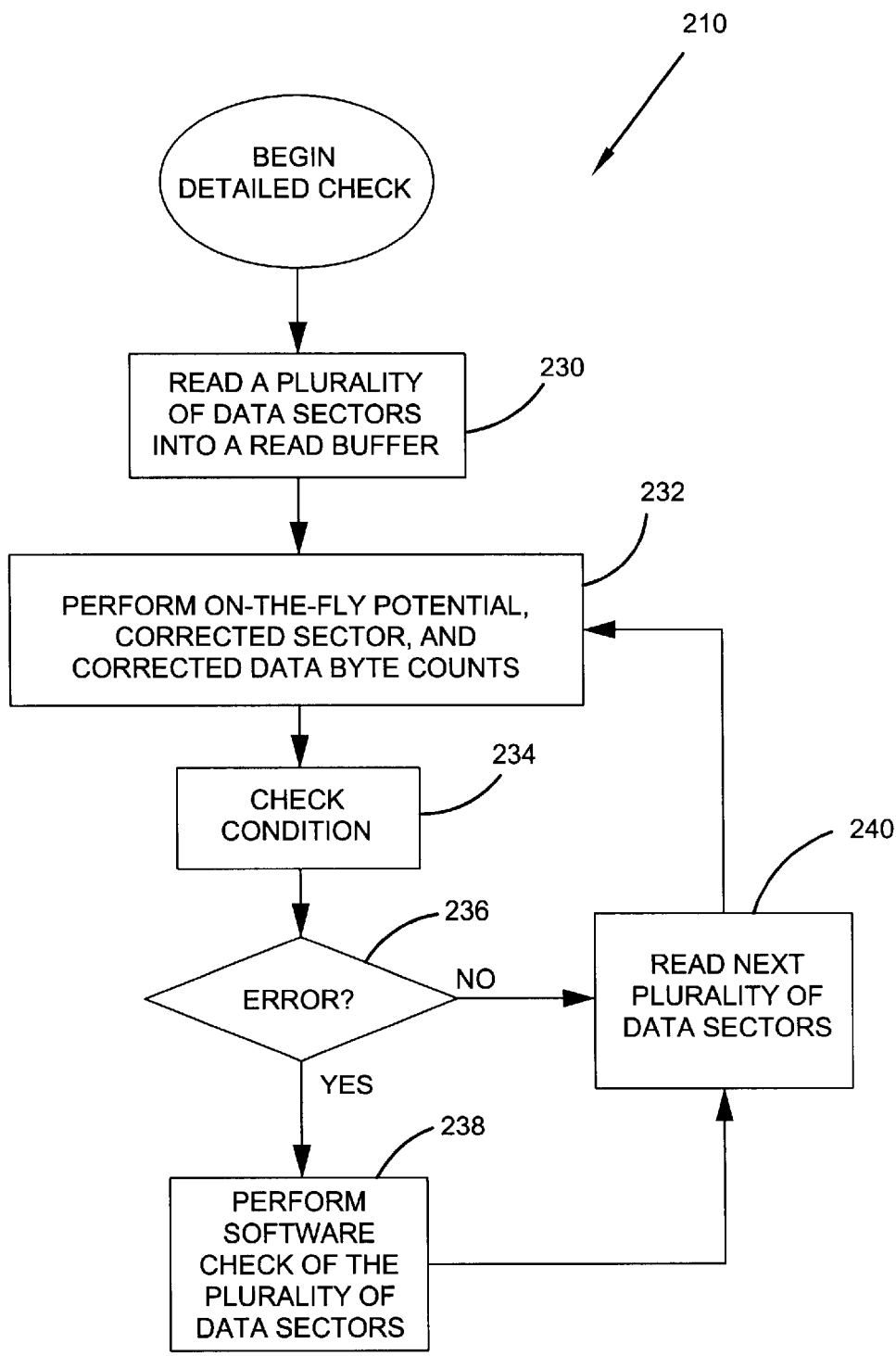
FIG. 7 is a flowchart illustrating a step of the method of FIG. 5, in accordance with an embodiment of the invention.

In accordance with a preferred embodiment of the invention, the detailed check 210 involves a combination of the use of the hardware features of system controller 150 (FIG. 2) along with the above-described software method. This embodiment of the invention is illustrated in the flowchart of FIG. 7. Initially, at step 230, a plurality of data sectors are read into the read buffer, the number of which depends on the size of the read buffer. Next, on-the-fly potential, corrected sector, and corrected byte counts are performed on the plurality of data sectors read into the read buffer, at step 232. Next, a check condition step 234 is performed on the potential, corrected sector, and corrected byte counts in the same manner as check condition step 204. The check condition step 234 provides an indication as to whether the plurality of data sectors read into the read buffer include or may potentially include a non-zero data byte, which is checked in step 236. If an error is returned, the method proceeds to step 238 in which the software check is performed on the plurality of data sectors in the read buffer. Once completed, the method proceeds to step 240 in the event that additional data sectors of the data track remain to be read into the read buffer. In the event that the data track is determined to contain only zero data bytes, the method moves from step 236 to step 240 and proceeds as described above. If, at step 240, no additional data sectors remain to be checked the method returns to step 208 and a new data track is read if desired. This embodiment of the invention has advantages over the detailed check that is performed using solely the software method, since performing the software check on every data word of the data track can be avoided, thereby decreasing the time required to complete a PZV test on a given data track.

As discussed above, the PZV test of the prior art conducted in software is extremely time consuming. As a result, the certification process that uses such PZV tests generally limit the number of tracks that are tested for existence of non-zero data bytes. This is undesirable since the untested data tracks could potentially include non-zero data bytes thereby rendering some types of software inoperable on the disc drive. The primary advantage of the present invention for performing a PZV test on a disc drive is that it can complete the test much more efficiently than the prior art. Additionally, the present invention can be combined with the error rate performance test to further facilitate the certification process. The differences between the two methods are enormous. For example, using the software method of the prior art to perform a PZV test on only 100 tracks of a 4-head disc drive, would take approximately 24 minutes. When combined with the error rate performance test, the completion of the two tests would take approximately 40 minutes. In comparison, using the PZV test of the present invention on an entire 4-head disc drive (i.e., hundreds of thousands of tracks) while also performing the patterned zero verification test, would take approximately 18 minutes, which is roughly two minutes longer than what the error rate performance test takes when conducted separately. Accordingly, the PZV test of the present invention not only improves disc drive certification process efficiency, but results in disc drives having improved reliability.

In summary, the present invention is directed to a method for testing at least one data track of a disc (such as 102) of a disc drive storage system (such as 100), to determine whether bytes of user data stored thereon represent the value zero or, in other words, are zero data bytes. The disc drive is adapted to perform on-the-fly air correction code (EEC) correction (such as 188) of data bytes. In the method, a data track is read (such as at step 200). During the read, on-the-fly counting: of potential non-zero data bytes (potential count); sectors on which EEC correction has been performed (corrected sector count); and user data bytes on which EEC correction has been performed (corrected byte count); is performed on the read data (such as at step 202). Next, a check is made as to whether at least one condition exists that would confirm that the data track includes only zero data bytes. One of these conditions is that the potential count is zero (such as at step 212). Another of these conditions is that the corrected sector count is equal to the potential count (such as at step 222). Yet another of these conditions is that the corrected sector count is one and the corrected byte count is equal to the potential count (such as at steps 224 and 226).

In accordance with another embodiment of the invention, other conditions are checked to determine whether the data track includes a non-zero data byte. One of these conditions is that the potential count is not equal to zero, and the corrected sector count is equal to zero (such as at steps 212 and 218). Another of these conditions is that the corrected sector count is equal to one and the corrected byte is not equal to the potential count (such as at steps 224 and 226).

In yet another embodiment of the invention, a condition is checked to determine whether the data track includes a potentially non-zero data byte. The condition is that the corrected sector count is greater than one and the sector count is not equal to the potential count (such as at steps 222 and 224).

In another embodiment of the invention, the method performs a detailed check (such as at step 210) of the data track when the data track includes either a non-zero data byte or a potentially non-zero data byte. In one embodiment of the detailed check, a plurality of data sectors of the read track are read into a read buffer (such as at step 160). Next, a data word is fetched from the read buffer (such as at step 162) and a check is made as to whether the data word contains only zero data bytes (such as at step 164). If the data word does not contain only zero data bytes, the location of the data word is recorded in an error log (such as at step 168). Otherwise, the fetching (such as at step 162), checking (such as at step 164), and the recording (such as at step 168) steps are repeated until all of the data words of the read buffer have been fetched and checked (such as at step 166). Once all of the data words of the read buffer have been checked, remaining data sectors of the data track are read into the read buffer (such as at step 172). Otherwise, the method can proceed to the next data track (such as at step 174).

In accordance with another embodiment of the invention, the detailed check performs the on-the-fly potential, corrected sector, and corrected byte counts (such as at step 232) of a plurality of data sectors that are read into the read buffer (such as at step 230). Various conditions, such as those described above, are checked to determine whether the read data sectors include a non-zero data byte or a potentially non-zero data byte (such as at step 234). If it is determined that the data sectors include a non-zero or a potentially non-zero data byte, the above-described software check is performed on the data sectors read into the read buffer (such as at step 238). On the other hand, if the data sectors include only zero data bytes, a next plurality of data sectors are read into the read buffer (such as at step 240) and the various counts are performed again (such as at step 232). This continues until all of the data sectors have been checked.

Another embodiment of the invention is directed to a disc drive storage system (such as 100) that includes a magnetic disc (such as 102), a read/write head (such as 130), and an system controller (such as 150). The system controller includes an error counter (such as 192), an ECC sector counter (such as 194), and an ECC byte counter (such as 196). The system controller is programmed to perform the method described above to detect the existence of non-zero and potentially non-zero data bytes within the data tracks of the disc.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the method while maintaining substantially the same functionality without departing from the scope and spirit of the present invention.

What is claimed is:

1. A method for testing at least one data track to determine whether bytes of user data stored thereon represent the value zero (zero data bytes), the disc drive adapted to perform on-the-fly error correction code (ECC) correction of data bytes, the method comprising steps of:
    (a) reading a data track;
    (b) performing on-the-fly counting of potential non-zero data bytes (potential count);
    (c) performing on-the-fly counting of sectors on which ECC correction has been performed (corrected sector count);
    (d) performing on-the-fly counting of user data bytes on which ECC correction has been performed (corrected byte count); and
    (e) checking whether at least one of the following conditions exists to confirm that the data track includes only zero data bytes:
        (1) the potential count is zero;
        (2) the corrected sector count is equal to the potential count; and
        (3) the corrected sector count is one and the corrected byte count is equal to the potential count.

2. The method of claim 1, including a step (f) of proceeding to a next data track and repeating steps (b)–(e) when the data track includes only zero data bytes.

3. The method of claim 1, including a step (f) of checking whether at least one of the following conditions exists to confirm that the data track includes a non-zero data byte: (1) the potential count is greater than zero and the corrected sector count is zero; and (2) the corrected sector count is one and the corrected byte count is not equal to the potential count.

4. The method of claim 3, including a step (g) of performing a detailed check of the data track when the data track includes a non-zero data byte including locating the non-zero data byte and recording its location in an error log of the disc drive.

5. The method of claim 4, wherein the performing step (g) comprises steps of:
    (g) (1) reading a plurality of data sectors of the read track into a read buffer;
    (g) (2) fetching a data word from the read buffer;
    (g) (3) checking whether the data word contains only zero data bytes;
    (g) (4) recording a location of the data word in an error log when it does not contain only zero data bytes;
    (g) (5) repeating steps (g) (2)–(g) (4) until all of the data words of the read buffer have been fetched;
    (g) (6) reading a next plurality of data sectors of the read track into the read buffer; and
    (g) (7) repeating steps (g) (2)–(g) (6) until all of the sectors of the data track have been read into the read buffer.

6. The method of claim 5, including a step (h) of proceeding to a next data track and returning to step (b) until all of the data tracks have been tested.

7. The method of claim 3, including a step (g) of checking whether the following condition exists to confirm that the data track potentially includes a non-zero data byte: the corrected sector count is greater than one and the corrected sector count is not equal to the potential count.

8. The method of claim 4, wherein the performing step (g) comprises steps of:
    (g) (1) reading a plurality of data sectors of the read track into a read buffer;
    (g) (2) repeating steps (a)–(f) to detect whether the non-zero data byte is contained within the plurality of data sectors;
    (g) (3) reading a next plurality of data sectors of the read track into the read buffer and repeating step (g) (2) when the plurality of data sectors does not contain a non-zero data byte;
    (g) (4) fetching a data word from the read buffer;
    (g) (5) checking whether the data word contains only zero data bytes;
    (g) (6) recording a location of the data word in an error log when it does not contain only zero data bytes;
    (g) (7) repeating steps (g) (4)–(g) (6) until all of the data words of the read buffer have been fetched; (g) (8) reading a next plurality of data sectors of the read track into the read buffer; and
    (g) (9) repeating steps (g) (2)–(g) (8) until all of the sectors of the data track have been read into the read buffer.

9. The method of claim 8, including a step (h) of proceeding to a next data track and returning to step (b) until all of the data tracks have been tested.

10. The method of claim 7, including a step (h) of performing a detailed check of the data track when the data track at least potentially includes a non-zero data byte including locating the non-zero data byte and recording its location in an error log of the disc drive.

11. The method of claim 10, wherein the performing step (h) comprises steps of:
    (h) (1) reading a plurality of data sectors of the read track into a read buffer;
    (h) (2) fetching a data word from the read buffer;
    (h) (3) checking whether the data word contains only zero data bytes;
    (h) (4) recording a location of the data word in an error log when it does not contain only zero data bytes;
    (h) (5) repeating steps (h) (2)–(h) (4) until all of the data words of the read buffer have been fetched; (h) (6) reading a next plurality of data sectors of the read track into the read buffer; and (h) (7) repeating steps (h) (2)–(h) (6) until all of the sectors of the data track have been read into the read buffer.

12. The method of claim 11, including a step (i) of proceeding to a next data track and returning to step (b) until all of the data tracks have been tested.

13. The method of claim 10, wherein the performing step (h) comprises steps of:
(h) (1) reading a plurality of data sectors of the read track into a read buffer;
(h) (2) repeating steps (a)–(f) to detect whether the non-zero data byte is contained within the plurality of data sectors;
(h) (3) reading a next plurality of data sectors of the read track into the read buffer and repeating step (h) (2) when the plurality of data sectors does not contain a non-zero data byte;
(h) (4) fetching a data word from the read buffer;
(h) (5) checking whether the data word contains only zero data bytes;
(h) (6) recording a location of the data word in an error log when it does not contain only zero data bytes;
(h) (7) repeating steps (h) (4)–(h) (6) until all of the data words of the read buffer have been fetched;
(h) (8) reading a next plurality of data sectors of the read track into the read buffer; and
(h) (9) repeating steps (h) (2)–(h) (8) until all of the sectors of the data track have been read into the read buffer.

14. The method of claim 13, including a step (i) of proceeding to a next data track and returning to step (b) until all of the data tracks have been tested.

15. A disc drive storage system comprising:
a magnetic disc having a plurality of data tracks with data bytes stored therein;
a read/write head adapted for reading data from and writing data to the data tracks;
an system controller including an error counter, an ECC sector counter, and an ECC byte counter, the system controller programmed to perform steps of:
(a) reading a data track;
(b) performing on-the-fly counting of potential non-zero data bytes (potential count) using the error correction counter;
(c) performing on-the-fly counting of sectors on which ECC correction has been performed (corrected sector count) using the ECC sector counter;
(d) performing on-the-fly counting of user data bytes on which ECC correction has been performed (corrected byte count) using the ECC byte counter; and
(e) checking whether at least one of the following conditions, which, if true confirms that the data track includes only zero data bytes:
(1) the potential count is zero;
(2) the corrected sector count is equal to the potential count; and
(3) the corrected sector count is one and the corrected byte count is equal to the potential count.

16. A storage system comprising:
a disc containing a plurality of data tracks with data bytes stored thereon; and
a testing means for testing for the existence of non-zero data bytes in one of the data tracks during error correction code (ECC) compensation of the data track.

17. The system of claim 16, wherein the testing means determines whether conditions exist relating to on-the-fly counts to determine whether the data track includes at least one of only zero data bytes, a non-zero data byte, and a potentially non-zero data byte.

18. The storage system of claim 17 wherein the on-the-fly counts include:
a potential count relating to a number of potential non-zero data bytes;
a corrected sector count relating to a number of sectors on which ECC correction has been performed; and
a corrected byte count relating to a number of data bytes on which ECC correction has been performed.

19. The storage system of claim 18 wherein the conditions include at least one of:
the potential count is zero;
the corrected sector count is equal to the potential count;
the corrected sector count is one and the corrected byte count is equal to the potential count;
the value of the potential count is greater than zero and the corrected sector count is zero;
the value of the corrected sector count is one and the corrected byte count is not equal to the potential count; and
the corrected sector count is greater than one and the sector count is not equal to the potential count.

20. A method of testing whether data stored in a data track represent a value of zero (zero data bytes), the method comprising:
reading a portion of a data track;
counting potential non-zero data bytes (potential count);
counting sectors on which error correction code (ECC) correction has been performed (corrective sector count); and
checking whether at least one of the following conditions exist:
the potential count is zero; and
the corrected sector count is equal to the potential count.

21. The method of claim 20 including:
counting data bytes on which ECC correction has been performed (corrected byte count); and
checking whether the corrected byte count is equal to the potential count.

22. A method of testing whether data stored in a data track represent a value of zero (zero data bytes), the method comprising:
reading a portion of a data track;
counting potential non-zero data bytes (potential count);
counting data bytes on which error correction code (ECC) correction has been performed (corrected byte count); and
checking whether at least one of the following conditions exists:
the potential count is zero; and
the corrected byte count is equal to the potential count.

23. The method of claim 22 including:
counting sectors on which ECC correction has been performed (corrected sector count); and
checking whether the corrected sector count is equal to the potential count.

24. The method of claim 23 including checking whether the corrected sector count is one and the corrected byte count is equal to the potential count.

25. A method of testing whether data stored in a data track represent a value of zero (zero data bytes), the method comprising:

performing error correction code (ECC) correction of data contained in a data track; and performing a pattern zero verification test of the data contained in the data track based upon results of the ECC correction.

26. The method of claim 25 including:

reading the data track;

counting potential non-zero data bytes (potential count) of the data track; and checking whether the potential count is zero.

27. The method of claim 26 including counting sectors of the data track on which ECC correction has been performed (corrected sector count).

28. The method of claim 27 including checking whether the corrected sector count is equal to the potential count.

29. The method of claim 28 including:

counting data bytes of the data track on which ECC correction has been performed (corrected byte count); and checking whether the corrected sector count is one and the corrected byte count is equal to the potential count.

30. The method of claim 27 including counting counting data bytes of the data track on which ECC correction has been performed (corrected byte count) and checking whether the corrected byte count is equal to the potential count.

31. The method of claim 26 including:

counting data bytes of the data track on which ECC correction has been performed (corrected byte count); and checking whether the corrected byte count is equal to the potential count.

32. The method of claim 31 including:

counting sectors of the data track on which ECC correction has been performed (corrected sector count); and checking whether the corrected sector count is equal to the potential count.

33. The method of claim 32 including checking whether the corrected sector count is one and the corrected byte count is equal to the potential count.

* * * * *